US005404517A

United States Patent [19]

Ueda et al.

[11] Patent Number: 5,404,517

[45] Date of Patent: Apr. 4, 1995

[54] APPARATUS FOR ASSIGNING ORDER FOR SEQUENTIAL DISPLAY OF RANDOMLY STORED TITLES BY COMPARING EACH OF THE TITLES AND GENERATING VALUE INDICATING ORDER BASED ON THE COMPARISON

[75] Inventors: Hiroyuki Ueda, Yokohama; Kaoru Kumagai, Tokyo, both of Japan

[73] Assignee: Canon Kabushiki Kaisha, Tokyo, Japan

[21] Appl. No.: 240,217

[22] Filed: May 9, 1994

Related U.S. Application Data

[63] Continuation of Ser. No. 825,776, Jan. 21, 1992, abandoned, which is a continuation of Ser. No. 593,282, Oct. 5, 1990, abandoned, which is a continuation of Ser. No. 284,826, Dec. 14, 1988, abandoned, which is a continuation of Ser. No. 139,165, Dec. 21, 1987, abandoned, which is a continuation of Ser. No. 57,742, Jun. 3, 1987, abandoned, which is a continuation of Ser. No. 807,786, Dec. 12, 1985, abandoned, which is a continuation of Ser. No. 538,917, Oct. 4, 1983, abandoned.

[30] Foreign Application Priority Data

Oct. 15, 1982 [JP] Japan ................................ 57-181802

[51] Int. Cl.[6] ...................... G06F 15/20; G06F 15/21; G06F 15/40

[52] U.S. Cl. .................................... 395/600; 395/800; 400/61; 400/83; 364/419.01; 364/419.07; 364/419.13; 364/419.19; 364/222.81; 364/222.9; 364/225.6; 364/DIG. 1; 364/927.62; 364/943.43

[58] Field of Search ....................... 395/800, 600, 100; 382/57; 400/61, 63, 67, 70, 83; 364/419.01, 419.07, 419.13, 419.19

[56] References Cited

U.S. PATENT DOCUMENTS

| | | | |
|---|---|---|---|
| 3,273,130 | 9/1966 | Baskin et al. | 382/57 X |
| 3,334,335 | 8/1967 | Brick et al. | 382/57 X |
| 3,492,653 | 1/1970 | Fosdick et al. | 382/57 X |
| 3,839,702 | 10/1974 | Chaires et al. | 382/57 X |
| 3,974,496 | 8/1976 | Aptroot-Solowav | 364/518 |
| 4,105,997 | 8/1978 | McGinn | 382/57 |
| 4,117,542 | 9/1978 | Klausner et al. | 364/705.05 |
| 4,308,582 | 12/1981 | Berger | 364/419 |
| 4,381,551 | 4/1983 | Kanou et al. | 400/63 |
| 4,415,981 | 11/1983 | Cutter et al. | 364/518 |
| 4,445,195 | 4/1984 | Yamamoto | 364/523 X |
| 4,468,754 | 8/1984 | Asada et al. | 364/419 X |
| 4,475,013 | 10/1984 | Lee et al. | 379/355 |
| 4,567,573 | 1/1986 | Hashimoto et al. | 364/419 X |
| 4,597,056 | 6/1986 | Washizuka | 364/419 X |
| 4,623,985 | 11/1986 | Morimoto et al. | 364/419 X |
| 4,725,158 | 2/1988 | Ueda et al. | 400/63 |
| 4,742,481 | 5/1988 | Yoshimura | 364/419 X |
| 4,787,059 | 11/1988 | Yoshimura | 364/419 X |
| 4,796,185 | 1/1989 | Yoshimura et al. | 364/419 |
| 4,807,123 | 2/1989 | Komatsu et al. | 364/200 |

FOREIGN PATENT DOCUMENTS

| | | | |
|---|---|---|---|
| 0051259 | 5/1982 | European Pat. Off. . | |
| 2801707 | 9/1978 | Germany . | |
| 3141571 | 6/1982 | Germany . | |
| 0113434 | 10/1978 | Japan | 382/16 |
| 0137480 | 10/1981 | Japan | 382/16 |
| 0137481 | 10/1981 | Japan | 382/16 |
| 0137975 | 8/1982 | Japan | 382/16 |
| 2087115 | 5/1982 | United Kingdom | 400/144.2 |

OTHER PUBLICATIONS

*Fundamentals of Structured Programming Using Fortran;* R. C. Holt et al; 1977.

*Primary Examiner*—Thomas G. Black
*Assistant Examiner*—Paul Harrity
*Attorney, Agent, or Firm*—Fitzpatrick, Cella, Harper & Scinto

[57] ABSTRACT

A document processing apparatus which has a keyboard for inputting characters and instructions. The apparatus includes a memory that randomly stores the inputted characters as titles and documents. The memory includes a field associated with each of the titles for storing an evaluation value indicating an order for the sequential display of the titles. The evaluation value is generated by comparing each of the titles to each other to determine the order of the sequential display. The apparatus in response to the inputted instructions sequentially displays the titles in a forward or a reverse sequence.

28 Claims, 5 Drawing Sheets

FIG. 7
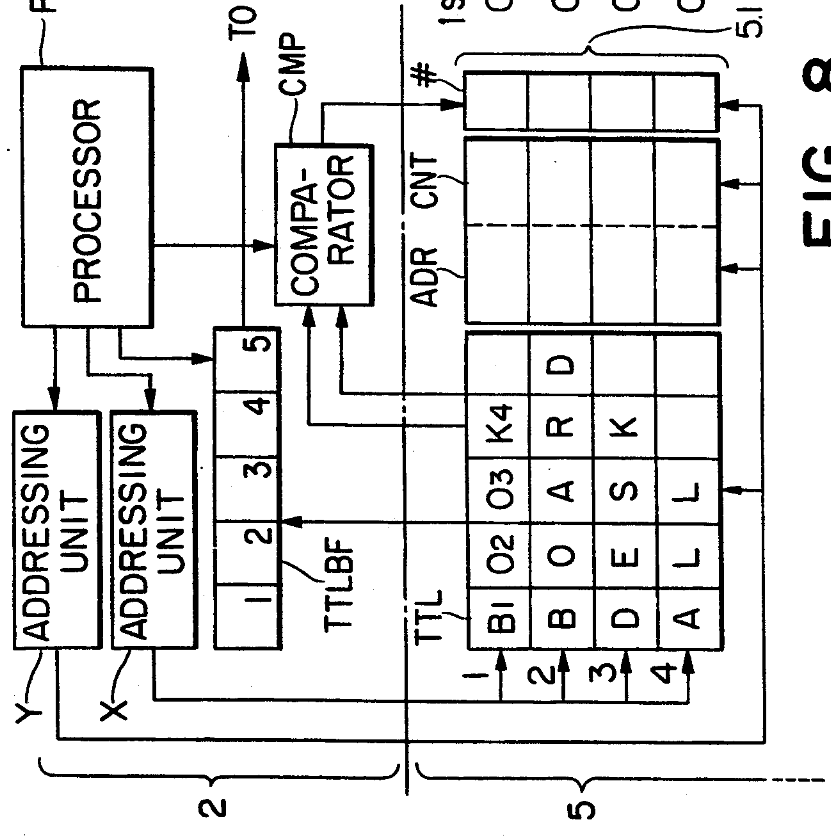
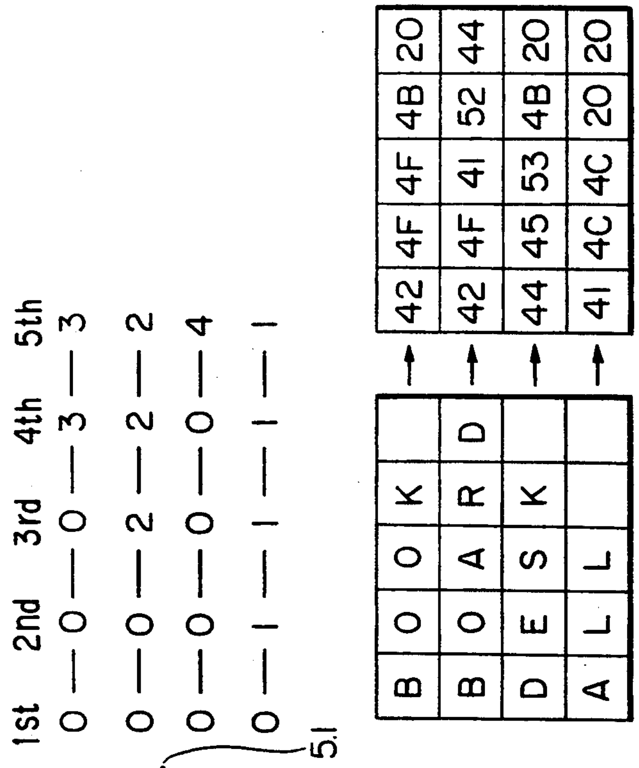
| | | | | |
|---|---|---|---|---|
| B | O | O | K | |
| B | O | A | R | D |
| D | E | S | K | |
| A | L | L | | |
| | | | | |
|---|---|---|---|---|
| 42 | 4F | 4F | 4B | 20 |
| 42 | 4F | 41 | 52 | 44 |
| 44 | 45 | 53 | 4B | 20 |
| 41 | 4C | 4C | 20 | 20 |
FIG. 8

APPARATUS FOR ASSIGNING ORDER FOR SEQUENTIAL DISPLAY OF RANDOMLY STORED TITLES BY COMPARING EACH OF THE TITLES AND GENERATING VALUE INDICATING ORDER BASED ON THE COMPARISON

This application is a continuation of application Ser. No. 07/825,776, filed Jan. 21, 1992, now abandoned, which is a continuation of application Ser. No. 07/593,282, filed Oct. 5, 1990, now abandoned, which is a continuation of application Ser. No. 07/284,826, filed Dec. 14, 1988, now abandoned, which is a continuation of application Ser. No. 07/139,165, filed Dec. 21, 1987, now abandoned, which is a continuation of application Ser. No. 07/057,742, filed Jun. 3, 1987, now abandoned, which is a continuation of application Ser. No. 06/807,786, filed Dec. 12, 1985, now abandoned, which is a continuation of application Ser. No. 06/538,917, filed Oct. 4, 1983, now abandoned.

BACKGROUND OF THE INVENTION

1. Field of the Invention

The present invention relates to a typewriter, and more particularly to an electronic typewriter.

2. Description of the Prior Art

The typewriter has advanced from mechanical models to electronic models. The electronic typewriter can handle a large amount of information and store and maintain sentences and information necessary for typing. The information has titles assigned to it by an operator so that it can be readily registered and retrieved.

FIG. 1 shows the keyboard of an electronic typewriter. SSW denotes a slide switch which instructs registration of document information into a memory when it is at a rightmost position STR, and instructs retrieval of the document information from the memory when it is at another position. P·FORM denotes a key used to register or retrieve information for a page format, that is, tabulations and margins for a special format, S·FORM denotes a key used to register or retrieve information for a stop position format, that is, start position data for records on a specific slip, and TEXT denotes a key used to register or retrieve a document. INDEX denotes a key to instruct line feed, REVINDEX denotes a key to instruct reverse line feed, RTN denotes a key to instruct carriage return, * denotes a key to instruct a punctuation in a series of operations, and REPEAT denotes a key to instruct repetition of a key depressed immediately before.

FIG. 2 shows an external view of a display which comprises a 20-digit fluorescent display tube. The display tube of FIG. 2 is usually arranged on the top of the keyboard of FIG. 1 so that an operator can readily watch it.

FIG. 3 shows a flow chart for registering a document. In a step 3.1, the slide switch SSW is set to STR to instruct a new registration. In a step 3.2, the TEXT key is depressed, and in a step 3.3, a desired AS title is entered by character keys. In a step 3.4, the * key is depressed and in a step 3.5, the inputting of the document is started. After the document has been input, the TEXT key is again depressed in a step 3.6 to terminate the registration operation.

FIG. 4 shows a flow chart for retrieving the document in the prior art system. In a step 4.1, the slide switch SSW is set to a position other than STR to instruct the retrieval of the registered document by generating a document retrieval instruction. In a step 4.2, the TEXT key is depressed, and in a step 4.3, the title of the registered document is entered. It is apparent that the document cannot be retrieved if a correct title is not entered. After the title inputting step 4.3, the * key is depressed in a step 4.4 and in a step 4.5 the registered document is amended or additional data is input, and in a step 4.6, the TEXT key is depressed again to terminate the retrieval operation.

A disadvantage in the document retrieval operation described above is that the input title must be identical to the registered one. Thus, the operator must perfectly remember the registered title. This is a substantial burden to the operator when the number of registered documents is large.

SUMMARY OF THE INVENTION

It is an object of the present invention to provide a retrieving system which is simpler than the prior art retrieving system and can be readily operated.

It is another object of the present invention to provide an apparatus which allows the retrieval of a document even if an operator forgets a title of the document, and has a memory for storing an order of titles so that the titles are referenced at a high speed and in sequential order.

BRIEF DESCRIPTION OF THE DRAWINGS

FIGS. 7 and 8 illustrate the relationship between a control unit and a document memory.

DETAILED DESCRIPTION OF THE PREFERRED EMBODIMENTS

Figure 1:
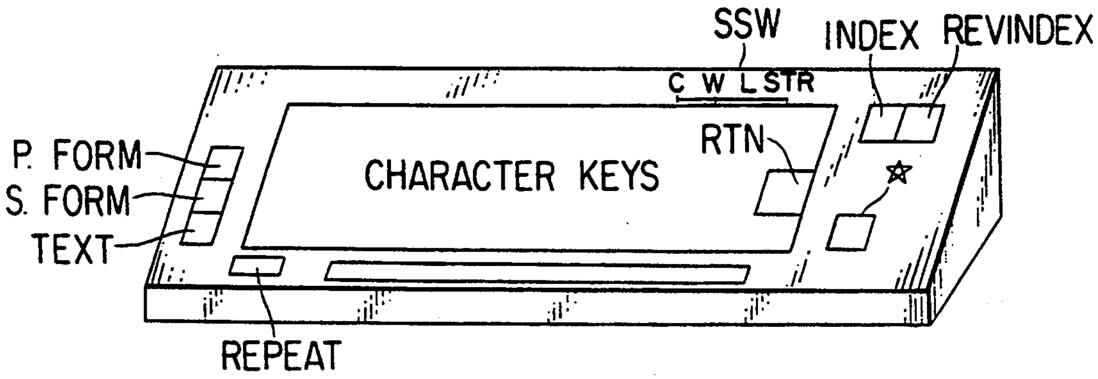
FIG. 1 PRIOR ART
FIG. 1 shows a keyboard of the conventional electronic typewriter.
Figure 2:
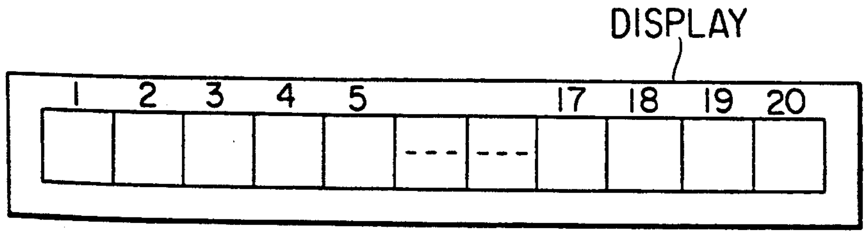
FIG. 2 PRIOR ART
FIG. 2 shows a display of the conventional electronic typewriter.
Figure 3:
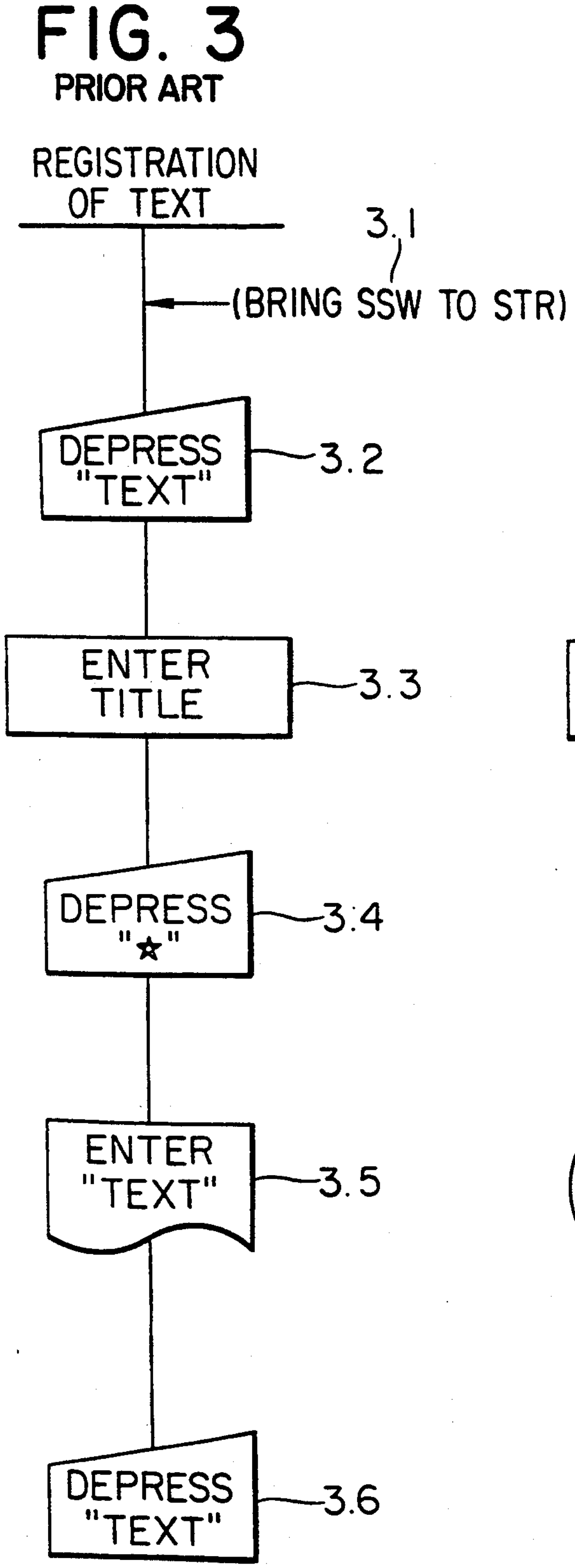
FIG. 3 PRIOR ART
FIG. 3 shows document registration steps in the conventional system.
Figure 4:
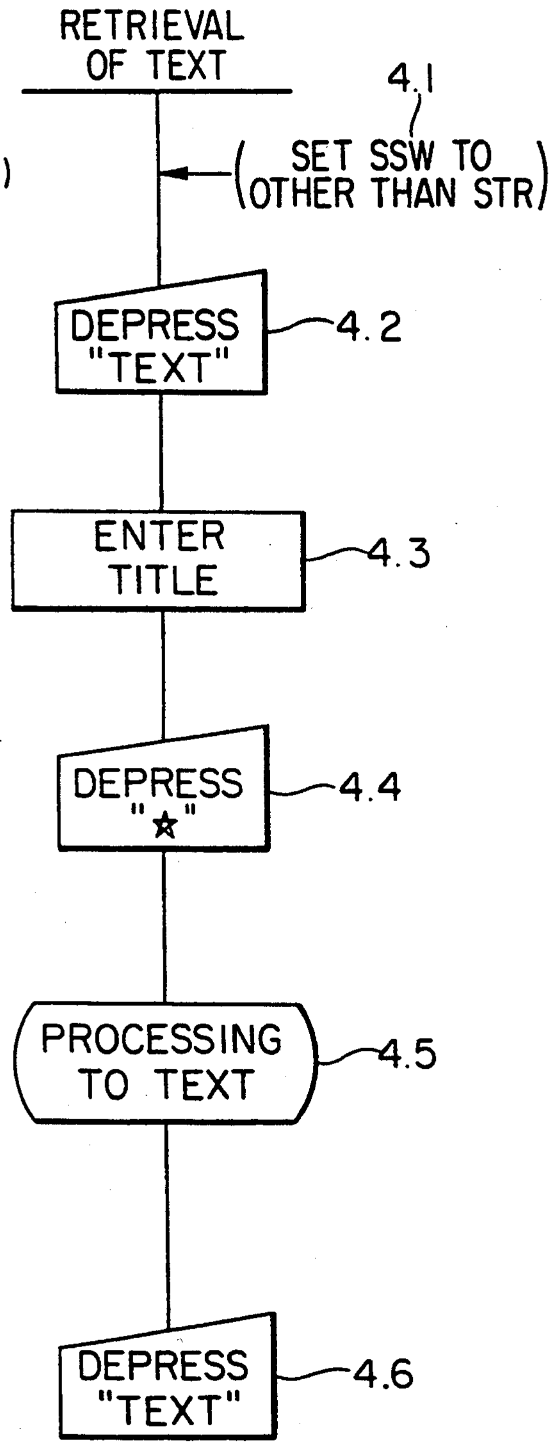
FIG. 4 PRIOR ART
FIG. 4 shows document retrieval steps in the prior art system.
Figure 5:
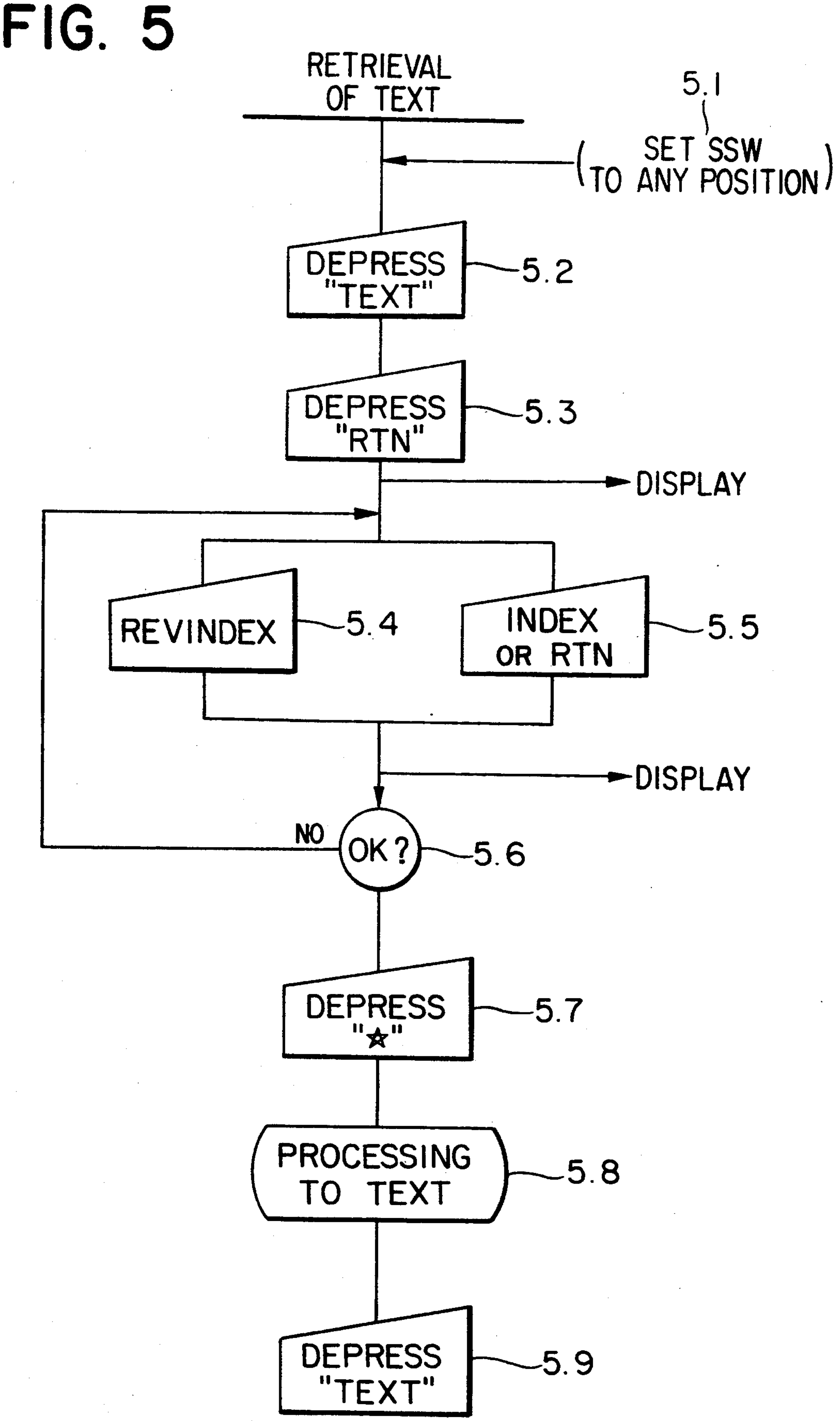
FIG. 5 shows document retrieval steps in accordance with the present invention.

A document retrieval method of the present invention is shown in FIG. 5. In a step 5.1, the slide switch SSW is set to any desired position to generate a document retrieval instruction. In a step 5.2, the TEXT key is depressed and in a step 5.3, the RTN key is depressed. Immediately after the depression in the step 5.3, one of the titles of the registered documents is displayed. If more than one document has been registered, the titles of the respective documents are assigned numbers by a given rule in accordance with ASCII codes so that the title having the lowest numerical value is displayed first. If the title displayed is not the one desired by the operator, steps 5.4 and 5.5 are carried out. In the step 5.4, the REVINDEX key is depressed to instruct display of the titles in the reverse sequence to the numeric value sequence, and in the step 5.5, the INDEX key or the RTN key is depressed to instruct the display in the forward sequence. Thus, REVINDEX INDEX and RTN keys all generate a title search instruction. When the desired title is displayed, the * key is depressed in a step 5.7 to produce a selection instruction. Steps 5.8 and 5.9 are similar to the steps 4.5 and 4.6, respectively.

Figure 6:
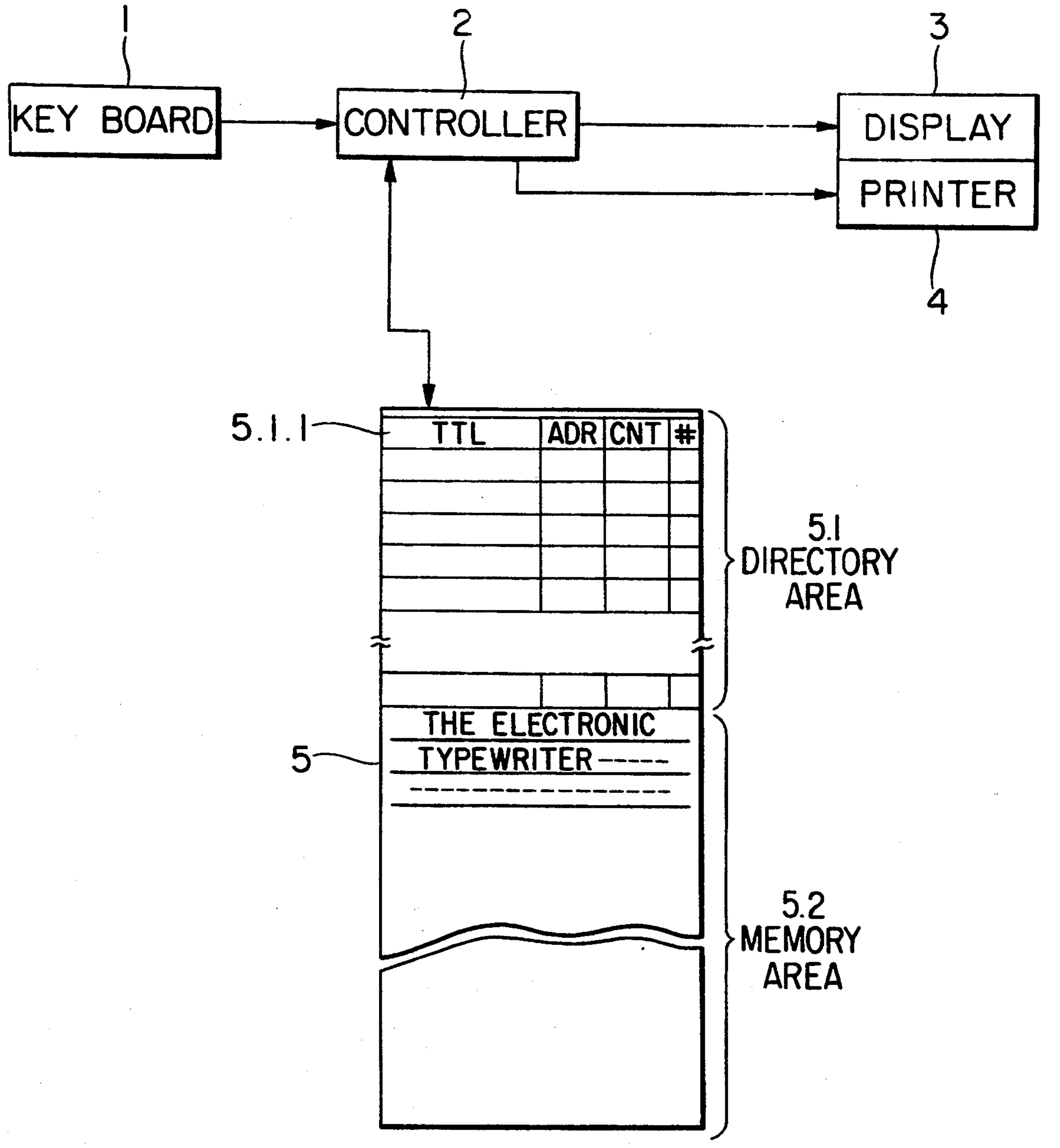
FIG. 6 shows a system configuration of an embodiment of the present invention.

A specific embodiment of the present invention is shown in the block diagram of FIG. 6. Numeral 1 denotes a keyboard, numeral 2 denotes a controller, numeral 3 denotes a display, numeral 4 denotes a printer and numeral 5 denotes a document memory. Input information entered by the keyboard 1 is processed by the controller 2 and the processed data are sent to the display 3, the printer 4 and the document memory 5. The controller 2 can also read out the document information from the document memory 5.

The document memory 5 is divided into a directory area 5.1 and a memory area 5.2. The directory area 5.1 manages the memory area 5.2. The memory area 5.2 contains the documents or character strings coded in accordance with the ASCII code. The directory area 5.1 also includes managing information for the documents, which comprises a TTL field for storing the titles consisting of character strings, an ADR field for indicating a start address of the document associated with each title, a CNT field for indicating a size of the document and a # field for storing the numerical value of the title. The controller 2 can write into and read from any location in the document memory 5. The relationship between the controller 2 and the document memory 5 which is pertinent to the present invention is explained below. FIG. 7 illustrates the controller 2 and the document memory 5 of the present invention. X denotes an addressing unit for specifying the managing information for each document, Y denotes an addressing unit for specifying one of the fields TTL, ADR, CNT and #, TTLBF denotes a buffer for temporarily storing the title information stored in the TTL field of the document memory, and CMP denotes a comparator. A processor PROC can issue an instruction to either of the addressing units X and Y, the buffer TTLBF and the comparator CMP. Let us assume that the key operation is at the step 5.3 in FIG. 5 and the RTN key is depressed. The controller 2 first clears all of the # fields in the managing information. After the initialization, the processor PROC compares the first managing information 1 with the next managing information 2 by using the addressing units X and Y. Assuming that a title "BOOK" is contained in the TTL field of the first managing information 1 and a title "BOARD" is contained in the TTL field of the next managing information 2, the character information are compared character by character to the right starting from the leftmost character. The character string "BOOK⊔" is represented by the ASCII code as "42, 4F, 4F, 4B, 20" as shown in FIG. 8, and the character string "BOARD" is represented as "42, 4F, 41, 52, 44".

At the first character comparison, "42" and "42" are compared and the result of comparison is "equal". In this case, the next characters must be compared. At the second character comparison, "4F" and "4F" are compared and the result of comparison is also "equal". Thus, the third characters are compared. At the third character comparison, the result "4F>41" is obtained. The number 2 of the smaller managing information is stored in the processor PROC. Then, the managing information 2 which has just been stored is compared with another managing information. Namely, "BOARD" and "DESK⊔" are compared. At the first character comparison, the result "42<44" is obtained. The number 2 of the smaller managing information is then stored again in the processor PROC. Then, "BOARD" and "ALL⊔⊔" are compared. At the first character comparison, the result "42>41" is obtained. In this manner, it is determined that the smallest managing information is the information 4 "ALL⊔⊔", and "1" representing a first order is written in the # field at the address 4 of the memory area 5.1 (2nd). In the next step, the comparison is made for the managing information having "0" in the # field and "2" representing the second order is written in the # field of the managing information 2 (3rd). In a similar manner, the third order and the fourth order are determined. In other words, the order is determined in accordance with a rule used in a language dictionary. Then, the TTL field of the first order managing information is transferred to the buffer TTLBF and then sent to the display 3.

For the depression of the INDEX key or the RTN key shown in the step 5.5 of FIG. 5, the TTL field of the next order managing information is displayed. On the other hand, for the depression of the REVINDEX key shown in the step 5.4, the TTL field of the previous order is displayed. The title may be printed out by the printer 4.

What we claim is:

1. Document processing apparatus, comprising:

key input means for entering characters comprising documents and titles as a string of characters and for entering instructions into said apparatus for sequentially displaying each of the titles, and for retrieving the document associated with the currently displayed title;

means for storing the documents and titles in a random order, said storing means having a field for numbering, an evaluation value obtained by comparing each of titles being stored in the field to obtain a language dictionary word arrangement of the titles, and a currently displayed title being changed to a title to be displayed with other titles in a reverse sequence or in a forward sequence in accordance with the stored evaluation value;

means for assigning titles an order by comparing each of the titles and generating the evaluation value for each of the titles, the order of the titles being indicated by the generated evaluation values;

means responsive to generation of an instruction by said key input means for sequentially displaying each of the titles stored in said storing means in accordance with the order assigned thereto by said assigning means with display of one title being terminated upon display of the next title in accordance with the assigned orders thereof, the instruction for sequentially displaying each of the titles stored in said storing means entered by said key input means specifying the sequential display either in a forward sequence or a reverse sequence; and means responsive to an instruction for retrieving a document associated with the currently displayed title generated by said key input means for retrieving the document associated with the title displayed currently.

2. Document processing apparatus according to claim 1, wherein said display means is a one-line display.

3. A document processing apparatus according to claim 1, wherein said key input means enters a selection instruction into the apparatus instructing halting of sequential display of each of the titles stored in said storing means and the maintaining of the display of a currently displayed title.

4. Document processing apparatus according to claim 3, wherein the document associated with the title, the display of which is maintained in response to entry of the instruction for halting sequential display of each of the titles and for maintaining display of the currently displayed title, is read-out from said storing means.

5. Document processing apparatus according to claim 1, wherein the characters which constitute each of the titles are coded in ASCII.

6. Document processing apparatus comprising:

key input means for entering characters and instructions to said apparatus, the characters comprising words and the words comprising title information and a plurality of documents;

means for coding each of the characters entered by said key input means and for coding each word entered by said key input means as a number of digits;

memory means for storing a plurality of words in a random order, each word being comprised of at least one character and having a word code determined by the coding by said coding means of the at least one character of which each word is comprised, said memory means storing the title information input by said key input means, the title information corresponding to each document input by said key input means, said memory means having a field for numbering, an evaluation value obtained by comparing each of titles of the stored title information being stored in the field, and a currently displayed title information being changed to a title to be displayed with other titles in a reverse sequence or a forward sequence in accordance with the stored evaluation value;

means responsive to entry of an instruction by said key input means for reading out the stored words from said memory means in a read out order determined on the basis of the word code;

means for comparing each digit position of the numerals comprising the word codes to determine which is larger and for generating the evaluation value based on the comparison;

means for determining the read out order of the stored words on the basis of the evaluation value which is determined by the comparison of respective digit positions in each of said words; and means for displaying the words read out from said memory means by said reading out means in said read out order, said displaying means having a display capacity for displaying words less than the capacity of said memory means for storing words, said key input means entering an instruction for specifying one of a forward sequence and a reverse sequence for the order of display of the words.

7. A document processing apparatus according to claim 6, wherein one of said instructions entered by said key input means instructs sequential coding of the characters comprising the title information.

8. A document processing apparatus according to claim 6, wherein said apparatus further includes a buffer for temporarily storing the words read out by said reading out means.

9. Document processing apparatus according to claim 6, wherein said numerals are hexadecimal numerals.

10. Document processing apparatus according to claim 6, wherein said comparison means sequentially makes a comparison for each digit of the numerals in an order from higher digit lower digit.

11. Document processing apparatus according to claim 6, wherein said comparison means determines the order between two numerals by comparing one with the other for a lower digit position when the digits in a higher digit position are the same.

12. Document processing apparatus according to claim 6, wherein said coding means codes each of the characters into ACSII codes.

13. Document processing apparatus comprising:

means for inputting data representing documents and titles respectively associated with the documents by a plurality of key input operations;

means for storing characters comprising documents and titles associated therewith in a random order, said storing means having a field for numbering, an evaluation value obtained by comparing each of the titles being stored in the field to obtain a language dictionary word arrangement of the titles and a currently displayed title being changed to a title to be displayed with other titles in a reverse sequence or in a forward sequence in accordance with the stored evaluation value;

means for displaying a portion of the titles stored in said storing means;

means for generating a display control signal;

means for assigning the titles stored in said storing means an order by comparing each of the titles and generating the evaluation value for each of the titles;

order storing means for storing the order assigned by said assigning means; and control means responsive to the stored order in said order storing means for controlling said displaying means to sequentially display each of the titles stored in said storing means in accordance with the order assigned thereto by said assigning means by changing at least one displayed title to the following displayed title, so that one character of one displayed title corresponds to a first character of a next displayed title, regardless of the length of the titles.

14. Document processing apparatus according to claim 13, wherein said generating means generates a display control signal comprising a signal and another signal, wherein said control means is responsive to the signal to control said display means to display a first title in the assigned order and then is responsive to successive another signals to control said display means to sequentially display each of the titles in the assigned order following the first displayed title.

15. Document processing apparatus according to claim 13, wherein said storing means stores the characters in an ASCII code.

16. Document processing apparatus according to claim 13, wherein said control means includes means for directing the sequential display operation in a forward direction and a reverse direction.

17. Document processing apparatus according to claim 13, wherein said storing means includes a document store area and a management area to store retrieval data such as titles.

18. Document processing apparatus according to claim 13, further comprising call-up means for calling up a text corresponding to a title displayed on said display means.

19. Document processing apparatus, comprising:

means for inputting data representing documents and titles respectively associated with the documents by a plurality of key input operations and indicating a registration of the input documents and titles;

means, in response to the registration indication by said inputting means, for storing in a random order characters comprising documents and titles input by said inputting means, said storing means having a field for numbering, an evaluation value obtained by comparing each of the titles being stored in the field and a currently displayed title being changed to a title to be displayed with other titles in a reverse sequence or in a forward sequence in accordance with the stored evaluation value;

means for displaying a portion of the titles stored in said storing means;

means for generating first and second display control signals;

means for assigning the titles stored in said storing means an order by comparing each of the titles and generating the evaluation value for each of the titles, the order of the titles being indicated by the generated evaluation values; and control means responsive to said first display control signal for controlling said display means to display a first title stored in said storing means, the first title being first with respect to the other titles stored in said storing means in the order assigned thereto by said assigning means until successive second display control signals are generated and then responsive to said second display control signals for controlling said display means to sequentially display each of the titles stored in said storing means in the assigned order following the first displayed title.

20. Document processing apparatus according to claim 19, further comprising means for coding the characters to be stored in said storing means into ASCII codes.

21. Document processing apparatus according to claim 19, wherein said means for generating a display control signal is a single key which generates said first display control signal and subsequently said second display control signals upon the operation thereof.

22. Document processing apparatus according to claim 19, wherein said control means includes means for directing the sequential display operation in a forward direction and a reverse direction.

23. Document processing apparatus according to claim 19, wherein said storing means includes a document store area and a management area to store retrieval data such as titles.

24. Document processing apparatus according to claim 19, further comprising call-up means for calling up a text corresponding to a title displayed on said display means.

25. Document processing apparatus according to claim 19, wherein said control means sequentially updates a part of the displayed titles in response to the second display control signals.

26. Document processing apparatus according to claim 19, wherein said first and second display control signals are generated by depressing different keys.

27. A document processing method, comprising the steps of:

entering into a document processing apparatus characters comprising documents and titles as a string of characters and entering instructions for sequentially displaying each of the titles, and for retrieving a document associated with a currently displayed title;

storing the documents and titles in a random order in storing means, the storing means having a field for numbering, and storing an evaluation value obtained by comparing each of titles in the field to obtain a language dictionary word arrangement of the titles, and changing a currently displayed title to a title to be displayed with other titles in a reverse sequence or in a forward sequence in accordance with the stored evaluation value;

assigning titles an order by comparing each of the titles and generating the evaluation value for each of the titles, the order of the titles being indicated by the generated evaluation values;

sequentially displaying, in response to an instruction entered in said entering step, each of the titles stored in said storing means in accordance with the order assigned thereto by said assigning means with display of one title being terminated upon display of the next title in accordance with the assigned orders thereof, the instruction for sequentially displaying each of the titles stored in said storing means entered in said entering step specifying the sequential display either in a forward sequence or a reverse sequence; and retrieving a document associated with the currently displayed title in response to an instruction entered in said entering step for retrieving the document associated with the title displayed currently.

28. A document processing method, comprising the steps of:

entering characters and instructions into a document processing apparatus, the characters comprising words and the words comprising title information and a plurality of documents;

coding each of the characters entered by said entering step and coding each word entered in said entering step as a number of digits;

storing in memory means a plurality of words in a random order, each word being comprised of at least one character and having a word code determined by the coding by said coding step of the at least one character of which each word is comprised, storing in the memory means the title information input by said entering step, the title information corresponding to each document input by said entering step, the memory means having a field for numbering, storing in the field of the memory means an evaluation value obtained by comparing each of titles of the stored title information, and changing currently displayed title information to a title to be displayed with other titles in a reverse sequence or a forward sequence in accordance with the stored evaluation value;

reading out the stored words from the memory means in a read out order determined on the basis of the word code in response to the entry of an instruction in said entering step;

comparing each digit position of the numerals comprising the word codes to determine which is larger and generating the evaluation value based on the comparison;

determining the read out order of the stored words on the basis of the evaluation value which is determined by the comparison of respective digit positions in each of said words; and displaying with displaying means the words read out from the memory means by said reading out step in the read out order, the displaying means having a display capacity for displaying words less than the capacity of the memory means for storing words, said entering step entering an instruction for specifying one of a forward sequence and a reverse sequence for the order of display of the words.

* * * * *

UNITED STATES PATENT AND TRADEMARK OFFICE

CERTIFICATE OF CORRECTION

PATENT NO. : 5,404,517 Page 1 of 2

DATED : April 4, 1995

INVENTOR(S) : HIROYUKI UEDA, et al.

It is certified that error appears in the above-indentified patent and that said Letters Patent is hereby corrected as shown below:

ON THE COVER PAGE

[56] References Cited

U.S. PATENT DOCUMENTS

Insert --4,438,505 3/1984 Yanagiuchi, et al.....434/157--.
"Aptroot-Solowav" should read --Aptroot-Soloway--.

COLUMN 1

Line 59, "AS" should be deleted.

COLUMN 2

Line 64, "REVINDEX" should read --REVINDEX,--.

COLUMN 5

Line 66, "lower" should read --to lower--.

UNITED STATES PATENT AND TRADEMARK OFFICE

CERTIFICATE OF CORRECTION

PATENT NO. : 5,404,517 Page 2 of 2

DATED : April 4, 1995

INVENTOR(S) : HIROYUKI UEDA, et al.

It is certified that error appears in the above-indentified patent and that said Letters Patent is hereby corrected as shown below:

COLUMN 6

Line 27, "titles;" should read --titles, the order of the titles being indicated by the generated evaluation values;--.

Signed and Sealed this

Eighth Day of August, 1995

Attest:

BRUCE LEHMAN

*Attesting Officer* *Commissioner of Patents and Trademarks*